(12) United States Patent  
Isobe et al.

(10) Patent No.: US 7,245,845 B2
(45) Date of Patent: Jul. 17, 2007

(54) PRINTING APPARATUS, INFORMATION PROCESSING APPARATUS, AND PRINTING SYSTEM

(75) Inventors: Yoshinori Isobe, Toride (JP); Koji Doi, Yokohama (JP); Kenji Hiromatsu, Abiko (JP); Masashi Oyumi, Abiko (JP); Yukimasa Iseki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 11/084,125

(22) Filed: Mar. 21, 2005

(65) Prior Publication Data

US 2005/0214017 A1    Sep. 29, 2005

(30) Foreign Application Priority Data

Mar. 23, 2004   (JP)   ............... 2004-085238

(51) Int. Cl.
*G03G 15/00*   (2006.01)
(52) U.S. Cl. ................. 399/82; 399/87; 399/407
(58) Field of Classification Search ............ 399/81–85, 399/87, 407, 408, 410; 358/1.14, 1.15
See application file for complete search history.

(56) References Cited

U.S. PATENT DOCUMENTS

| | | | |
|---|---|---|---|
| 5,351,112 A | 9/1994 | Naito et al. ............... 355/233 |
| 5,579,083 A | 11/1996 | Naito et al. ............... 355/50 |
| 5,819,151 A | 10/1998 | Naito et al. ............... 399/367 |
| 6,311,029 B1 | 10/2001 | Sumio et al. .............. 399/82 |
| 6,385,406 B1 | 5/2002 | Funamizu et al. .......... 399/16 |
| 6,398,214 B1 | 6/2002 | Moteki et al. ............. 271/220 |
| 6,471,429 B1 | 10/2002 | Isobe et al. .............. 400/582 |
| 6,773,590 B2 | 8/2004 | Prutkin ................. 210/321.75 |
| 6,878,908 B2 | 4/2005 | Oyumi .................... 219/619 |
| 6,912,059 B1 | 6/2005 | Takahashi ................ 358/1.15 |
| 6,963,722 B2 | 11/2005 | Matsumoto et al. ........ 399/404 |

(Continued)

FOREIGN PATENT DOCUMENTS

JP    8-335150    12/1996

(Continued)

*Primary Examiner*—Hoang Ngo
(74) *Attorney, Agent, or Firm*—Fitzpatrick, Cella, Harper & Scinto

(57) ABSTRACT

An apparatus for executing a printing process on the basis of a print job from an external apparatus, comprises a post-processing unit which can apply post-processing for printed paper sheets using paper sheets prepared independently of the printed paper sheets; a detector for detecting in the post-processing means that the paper sheets prepared independently of the printed paper sheets are set; determination means for determining whether or not print start trigger information is attached to the print job, which indicates an instruction to start printing in response to trigger information to start printing; and print control means for, (i) when a print job designated with the post-processing by the post-processing unit is received and it is determined that the print start trigger information is attached to the received print job, delaying a process of the print job until the detector detects that the paper sheets are set, and starting execution of the print job when the detector detects that the paper sheets are set, (ii) and when a print job designated with the post-processing by the post-processing unit is received and it is determined that the print start trigger information is not attached to the received print job, starting the received print job independently of a detection by the detector.

7 Claims, 11 Drawing Sheets

U.S. PATENT DOCUMENTS

| | | | |
|---|---|---|---|
| 7,016,623 B2 | 3/2006 | Isobe | 399/88 |
| 2004/0021266 A1 | 2/2004 | Mizuta et al. | 271/303 |
| 2004/0178572 A1 | 9/2004 | Nishimura et al. | 271/298 |
| 2005/0007614 A1* | 1/2005 | Kishigami | 358/1.13 |
| 2005/0088709 A1* | 4/2005 | Kizaki et al. | 358/501 |
| 2005/0145619 A1 | 7/2005 | Oyumi | 129/619 |
| 2005/0185999 A1 | 8/2005 | Matsumoto et al. | 399/391 |

FOREIGN PATENT DOCUMENTS

| | | | |
|---|---|---|---|
| JP | 10-322533 | * | 12/1998 |
| JP | 2001-109599 | | 4/2001 |

\* cited by examiner

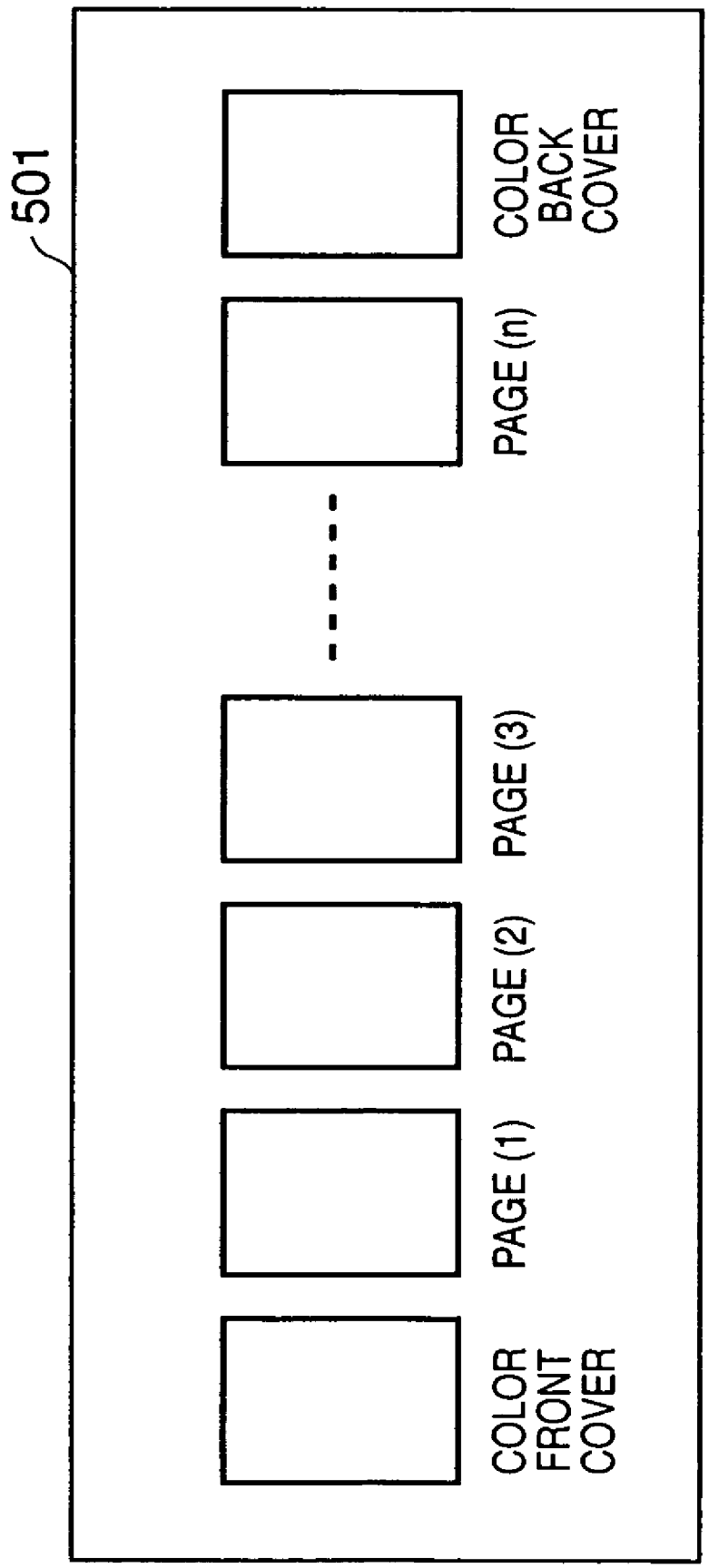

PRINTING APPARATUS, INFORMATION PROCESSING APPARATUS, AND PRINTING SYSTEM

FIELD OF THE INVENTION

The present invention relates to a printing system which can efficiently print a print job from a computer using a plurality of printers, copying machines, and the like having various post-processing apparatuses, which are connected in, e.g., a network environment.

BACKGROUND OF THE INVENTION

When a printing process is made by a network system to which a plurality of printers and copying machines are connected, the user selects one printer suited to a print job to execute the printing process. In order to allow a fast printing process, a system that divides one print job and controls a plurality of printers to parallelly print the divided jobs has been proposed (see Japanese Patent Laid-Open Nos. 2001-109599, 8-335150, and the like).

In order to reliably and efficiently make an operation for inserting and binding an insert sheet in output sheets on which images are formed, an insert reservation number is input every time paper sheets are set in an inserter of a printing apparatus. Also, a unique inserter reservation number is appended to a print job when the inserter is used. The print job that uses the inserter is executed when the inserter reservation number of the print job matches the insert reservation number which is input in correspondence with paper sheets currently placed on the inserter. If these numbers do not match, execution of the print job is delayed until the corresponding insert reservation number is input (see U.S. Pat. No. 6,311,029 and the like).

However, even the system which can divide one print job and control a plurality of printers to parallelly print the divided print jobs cannot divide post-processing. When post-processing such as stapling or the like is applied to printed sheets, the user must designate a printing apparatus to which a post-processing apparatus is connected upon printing. For this reason, the performance of the printing system which can divide a print job and parallelly print the divided jobs to attain a high-speed printing process cannot be fully utilized when the post-processing is required. For example, when a printer to which a post-processing apparatus is connected is a monochrome printer, the post-processing must be executed by that monochrome printer. Hence, color and monochrome printing processes must be executed by independent printers. In such case, even when the post-processing is to be executed together with color pages printed by a color printer, it is difficult for the monochrome printer with a post-processing unit to execute such post-processing. For this reason, even when a printer to which a post-processing apparatus is connected is available, color and monochrome pages must be independently printed, and the post-processing must be manually done for these printouts.

In this manner, it is often difficult for the conventional printing system to use the post-processing function of a printer when post-processing is to be applied to printouts.

SUMMARY OF THE INVENTION

The present invention has been made in consideration of the above prior arts, and has as its object to provide a printing system which can effectively utilize the post-processing function of a printing apparatus connected to a network.

The present invention has been made in consideration of the above prior arts, and has the following arrangement.

That is, a printing apparatus for executing a printing process on the basis of a print job from an external apparatus, comprises:

a post-processing unit which can apply post-processing for printed paper sheets using paper sheets prepared independently of the printed paper sheets;

a detector for detecting in the post-processing means that the paper sheets prepared independently of the printed paper sheets are set;

determination means for determining whether or not print start trigger information is attached to the print job, which indicates an instruction to start printing in response to trigger information to start printing; and print control means for, (i) when a print job designated with the post-processing by the post-processing unit is received and it is determined that the print start trigger information is attached to the received print job, delaying a process of the print job until the detector detects that the paper sheets are set, and starting execution of the print job when the detector detects that the paper sheets are set, (ii) and when a print job designated with the post-processing by the post-processing unit is received and it is determined that the print start trigger information is not attached to the received print job, starting the received print job independently of a detection by the detector.

With this arrangement, according to the present invention, even when a set of prints are to be distributed and printed by a plurality of printing apparatuses, a post-processing function of at least one of the plurality of printing apparatuses can be effectively used, thus allowing high-speed printing processing including the post-processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a print job to be explained in this embodiment;

DESCRIPTION OF THE PREFERRED EMBODIMENTS

First Embodiment

Figure 1:
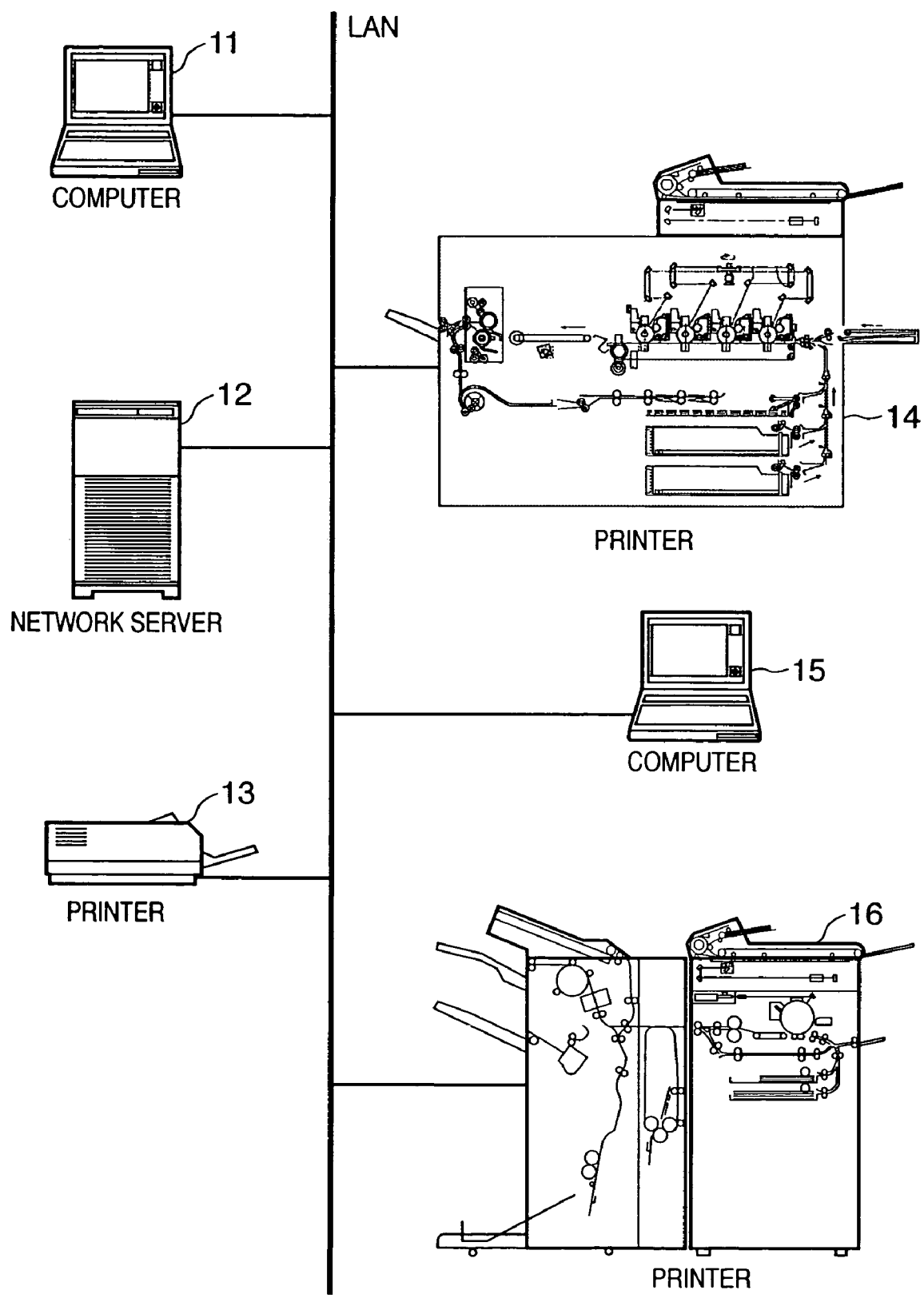
FIG. 1 is a diagram showing the overall system in a network environment in which an embodiment of the present invention is practiced.

The first embodiment of the present invention will be described hereinafter with reference to the accompanying drawings. FIG. 1 is a diagram showing the arrangement of the present invention. FIG. 1 illustrates a state wherein a local area network (to be referred to as a LAN hereinafter) to which computers, a network server, printers, and the like are connected is built. When a document is to be printed from a computer 11 or 15 connected to the LAN, a printing process can be executed by designating one or a plurality of printers 13, 14, and 16 connected to the LAN. Data from each computer is transferred to the printer directly or via a network server 12. Note that the printer 13 is a low-speed sprinter which can print several pages per minute. The printer 14 is a color multi-function peripheral (an apparatus which comprises both the functions of a printer and copying machine, and is called a multi-function peripheral (MFP)) that can perform a full-color printing process. The printer 16 is an MFP which comprises a post-processing unit (e.g., stapling and the like) for a bundle of sheets, and can perform a high-speed monochrome printing process. Also, printers and computers which have other intended purposes and performance may be connected to the LAN.

<Arrangement of Printer>

The arrangement of the printer 16 will be described below with reference to FIGS. 2, 3, and 4. The printer 16 comprises an image forming apparatus main body 1000 including an image reader unit 200 for reading a document image and a printer unit 300, a folding unit 400, and a finisher 500.

Figure 2:
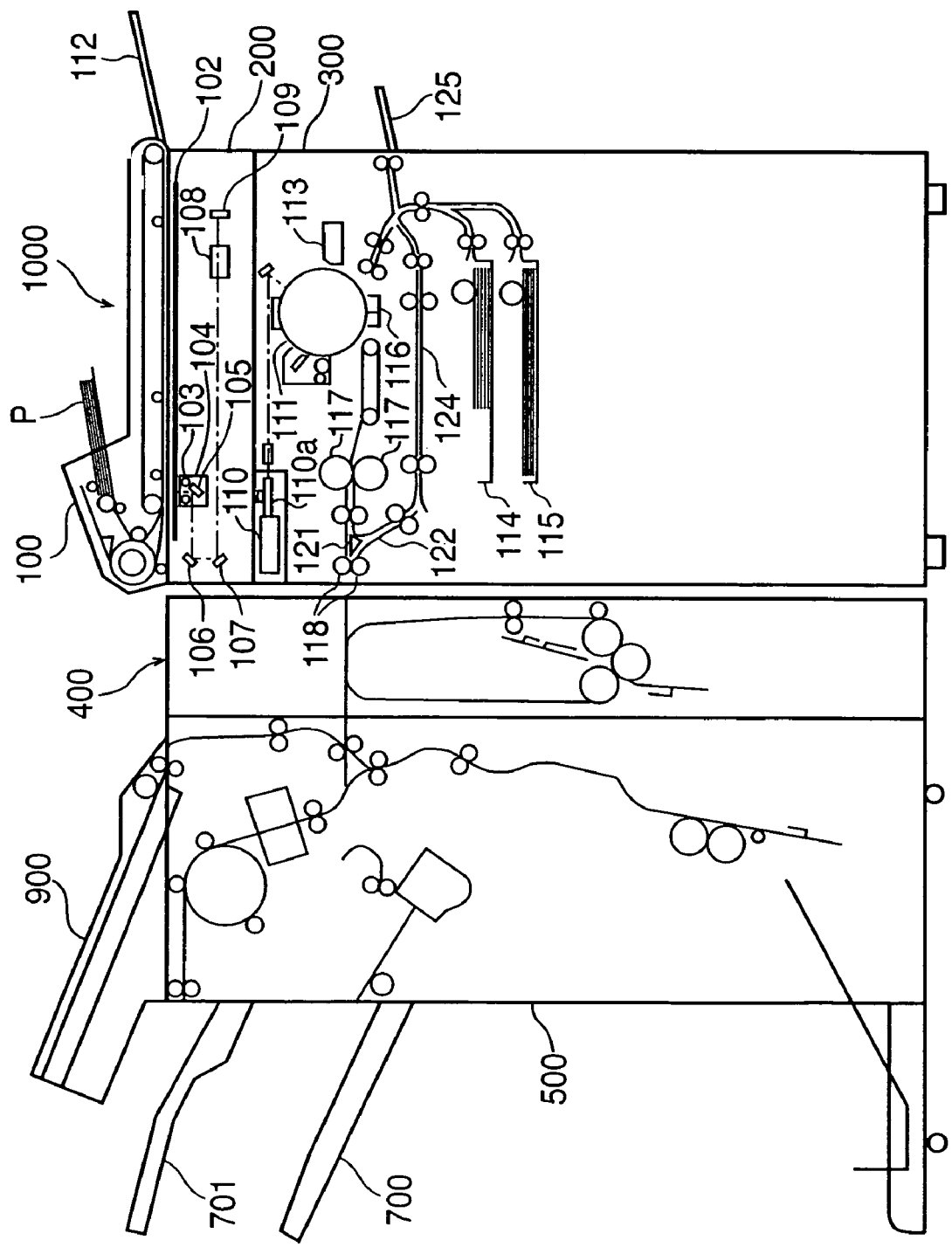
FIG. 2 is a sectional view showing a copying machine which comprises a post-processing unit according to this embodiment.

Referring to FIG. 2, a document feeder unit 100 is mounted on the image reader unit 200. The document feeder unit 100 separates pages of a document P, which is set facing up on a document tray, in turn from the uppermost page one by one, and feeds the separated page to the left direction. Then, the document feeder unit 100 converts the document page from the left to the right via a scan position on a platen glass 102 via a curved path, and then delivers it toward an external delivery tray 112. When the conveyed document page passes the scan position from the left to the right in FIG. 1, this document image is scanned by a scanner unit 104 which is held at a position corresponding to the scan position. When the document page passes the scan position, the scan surface of the document page is irradiated with light coming from a lamp 103 of the scanner unit 104, and light reflected by the document page is guided to a lens 108 via mirrors 105, 106, and 107. The light transmitted through the lens 108 forms an image on an imaging surface of an image sensor 109. An optically scanned image is converted into image data by the image sensor 109, and the image data is output. The image data output from the image sensor 109 undergoes predetermined processes by an image signal controller 202 (to be described later), and is then input to an exposure controller 110 of the printer unit 300 as a video signal.

The exposure controller 110 of the printer unit 300 modulates and outputs a laser beam on the basis of the input video signal. The laser beam is reflected by a polygonal mirror and the like, and strikes a photosensitive drum 111. The photosensitive drum 111 is scanned by the laser beam upon rotation of the polygonal mirror. An electrostatic latent image corresponding to the intensity of the laser beam scanned there is formed on the photosensitive drum 111. The electrostatic latent image on the photosensitive drum 111 is visualized as a toner image by toner supplied from a developer 113. A paper sheet is fed from a paper cassette 114 or 115, manual insert unit 125, or double-sided conveying path 124 at a timing synchronized with the beginning of irradiation of the laser beam. This paper sheet is fed to the gap between the photosensitive drum 111 and a transfer unit 116. The toner image formed on the photosensitive drum 111 is transferred onto the fed paper sheet by the transfer unit 116.

The paper sheet on which the toner image has been transferred is conveyed to a fixing unit 117 which fixes the toner image on the paper sheet by hot pressing. The paper sheet that has left the fixing unit 117 is delivered from the printer unit 300 toward an external unit (folding unit 400) via a flapper 121 and delivery rollers 118.

When the paper sheet is delivered with its image forming surface facing down (face down), the paper sheet that has left the fixing unit 117 is temporarily guided onto a reverse path 122 by the switching operation of the flapper 121. After the trailing end of the paper sheet has passed the flapper 121, the paper sheet is switched back and is delivered from the printer unit 300 via the delivery rollers 118. Such delivery pattern is called face-down delivery. Face-down delivery is made when images are formed in turn from the first page. For example, face-down delivery is made when an image scanned using the document feeder unit 100 is formed, when an image output from the computer is formed, and so forth. The order of delivered sheets matches a correct page order, i.e., the same page order as the scanned document pages or the same page order as a print job.

The paper sheet delivered from the printer unit 300 is fed to the folding unit 400. This folding unit 400 Z-folds the paper sheet. For example, when an A3- or B4-size sheet is selected and a folding process is designated, the folding unit 400 performs a folding process. Otherwise, the paper sheet delivered from the printer 300 passes through the folding unit 400, and is sent to the finisher 500. The finisher 500 is provided with an inserter which feeds paper sheets such as a cover sheet, inserting sheet, and the like to be inserted into paper sheets on which images are formed. The finisher 500 executes various processes such as a booklet process, binding process, punching, and the like. The folding unit 400, finisher 500, and inserter 900 correspond to post-processing apparatuses of the image forming apparatus 1000.

The arrangement of a controller which controls the overall printer will be described below with reference to FIG. 3. FIG. 3 is a block diagram showing the arrangement of a controller which controls the computer 11 and the overall printer 16 in FIG. 2. As shown in FIG. 3, a controller 1 has a CPU circuit unit 150, which incorporates a CPU (not shown), ROM 151, and RAM 152. The CPU circuit unit 150 systematically controls blocks 101, 153, 201, 202, 209, 301, 401, and 501 on the basis of control programs stored in the ROM 151. The RAM 152 is used as a work area which temporarily holds control data and is used for an arithmetic process upon control.

A document feeder unit controller 101 controls the document feeder unit 100 to drive in accordance with an instruction from the CPU circuit unit 150. An image reader controller 201 performs drive control of the scanner unit 104, image sensor 109, and the like and transfers an analog image signal output from the image sensor 109 to the image signal controller 202.

The image signal controller 202 converts the analog image signal from the image sensor 109 into a digital signal, and applies image processes to the digital signal as needed. The image signal controller 202 then converts the digital signal into a video signal, and outputs the video signal to a printer controller 301. Also, the image signal controller 202 applies various processes a digital image signal input from a computer 210 via an external I/F 209, converts this digital image signal into a video signal, and outputs the video signal to the printer controller 301. The processing operations of the image signal controller 202 are controlled by the CPU circuit unit 150. The printer controller 301 drives the aforementioned exposure controller 110 on the basis of the input video signal.

An operation unit 153 has a plurality of keys used to set various functions associated with image formation, a display unit for displaying information indicating a setting state, and the like. The operation unit 153 outputs a key signal corresponding to each key operation to the CPU circuit unit 150. The operation unit 153 displays corresponding information on its display unit on the basis of a signal from the CPU circuit unit 150.

A folding unit controller 401 is mounted in the folding unit 400, and performs drive control of the overall folding unit by exchanging information with the CPU circuit unit 150.

A finisher controller 501 is mounted in the finisher 500, and performs drive control of the overall finisher by exchanging information with the CPU circuit unit 150.

On the other hand, the computer 210 (the computers 11 and 15 in FIG. 1) comprises a memory 312 for storing data, programs, and the like, a CPU 311 for executing programs stored in the memory 312 to control the computer to execute a control sequence for controlling the printer to execute a print operation and the like, an input unit 313 such as a keyboard, pointing device, and the like, a display unit 315 including a display, LED indicators, and the like, and so forth. The computer 210 is connected to the LAN via a network interface 314.

The arrangement of the folding unit 400 and finisher 500 will be described below with reference to FIG. 4. FIG. 4 is a sectional view showing the arrangement of the folding unit 400 and finisher 500 shown in FIG. 2.

Figure 4:
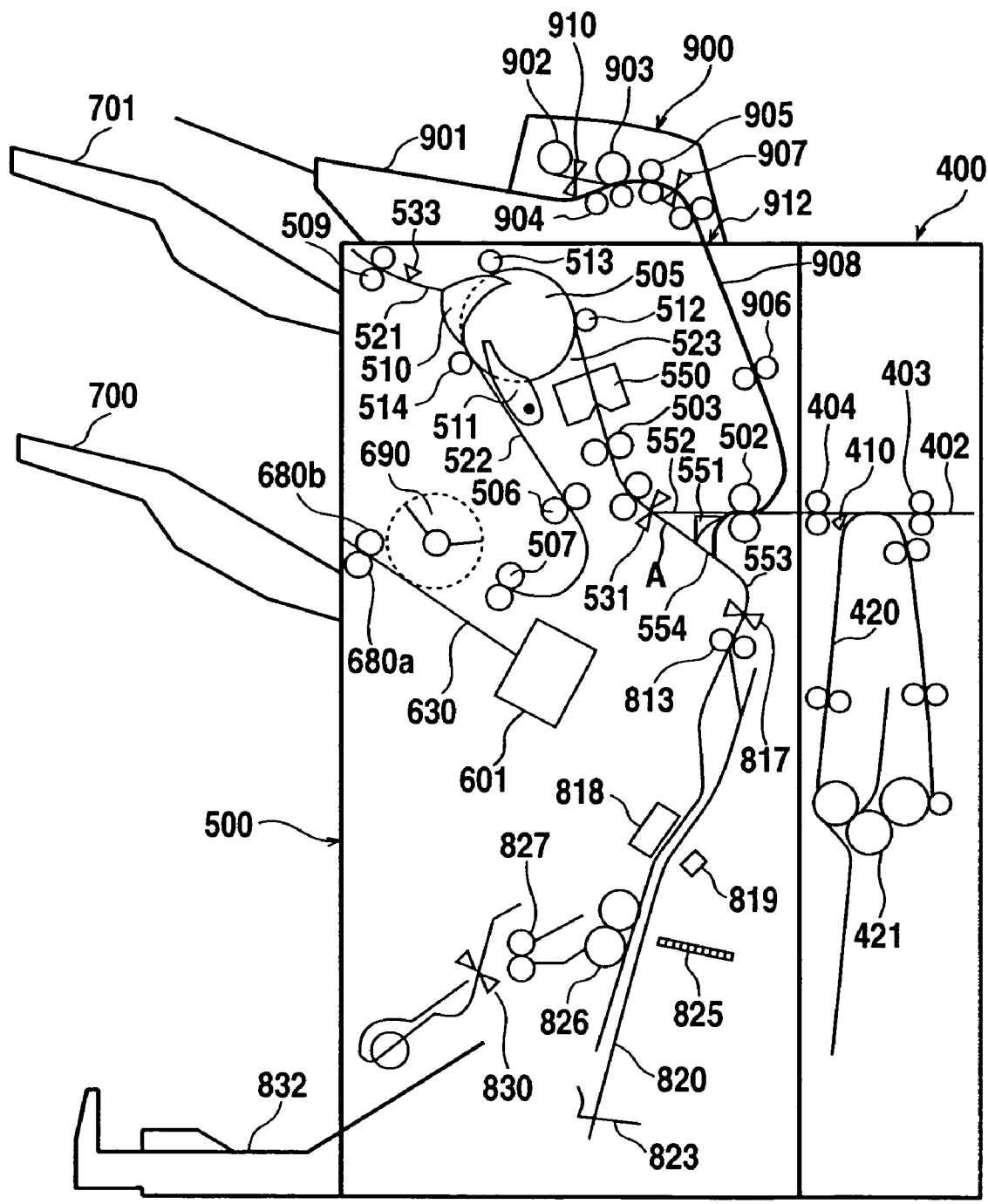
FIG. 4 is a sectional view showing details of the post-processing unit of the copying machine which comprises the post-processing unit according to this embodiment.

As shown in FIG. 4, the folding unit 400 has a horizontal conveying path 402 for guiding the paper sheet delivered from the printer unit 300 toward the finisher 500 side. Two pairs of conveying rollers 403 and 404 are arranged on the horizontal conveying path 402. A path select flapper 410 is provided at an exit (on the finisher 500 side) of the horizontal conveying path 402. This path select flapper 410 performs a switching operation for guiding the paper sheet on the horizontal conveying path 402 to one of a path 420 and the finisher 500 side. When a folding process is to be executed, the path select flapper 410 is set "ON", and the paper sheet is guided onto the path 420. The paper sheet guided onto the path 420 is conveyed to a roller 421 and is Z-folded. Contrary to this, when a folding process is to be skipped, the path select flapper 410 is set "OFF", and the paper sheet is directly fed from the printer 300 to the finisher 500 via the horizontal conveying path 402.

The finisher 500 fetches paper sheets delivered via the folding unit 400 in turn. Then, the finisher 500 performs sheet post-processing including a process for aligning a plurality of fetched paper sheets and binding them into a bundle, a staple process for stapling the trailing ends of a bundle of paper sheets by a stapler, a punch process for punching holes near the trailing end of the fetched paper sheet, a sort process, a non-sort process, a booklet process, and the like. As shown in FIG. 4, the finisher 500 has a pair of entrance rollers 502 for internally guiding the paper sheet which is delivered from the printer 300 via the folding unit 400. A switch flapper 551 for guiding the paper sheet toward a finisher path 552 or first booklet path 552 is provided on the downstream side of the pair of entrance rollers 502. The paper sheet guided onto the finisher path 552 is fed toward a buffer roller 505 via a pair of conveying rollers 503. The pair of conveying rollers 503 and buffer roller 505 can be rotated in the forward and reverse directions.

An entrance sensor 531 is arranged between the pair of entrance rollers 502 and the pair of conveying rollers 503. A second booklet path 554 branches from the finisher path 552 near the upstream side of the entrance sensor 531 along the paper conveying direction. This bifurcation will be referred to as a bifurcation A hereinafter. This bifurcation A forms a bifurcation leading to a conveying path for conveying the paper sheet from the pair of entrance rollers 502 to the pair of conveying rollers 503. When the pair of conveying rollers 503 are rotated in the reverse direction and convey the paper sheet from the pair of conveying rollers 503 side toward the entrance sensor 531 side, the bifurcation A forms a bifurcation having a one-way mechanism for conveying the paper sheet to the second booklet path 554 side.

A punch unit 550 is arranged between the pair of conveying rollers 503 and buffer roller 505. The punch unit 550 operates as needed, and punches holes near the trailing end of the conveyed paper sheet. The buffer roller 505 can bind up a predetermined number of fed paper sheets on its outer circumferential surface to overlap each other. The paper sheets are wound around the outer circumferential surface of this roller by pressing rollers 512, 513, and 514 as needed. The paper sheets wound around the buffer roller 505 are conveyed in the rotation direction of the buffer roller 505.

A switch flapper 510 is arranged between the pressing rollers 513 and 514, and a switch flapper 511 is arranged on the downstream side of the pressing roller 514. The switch flapper 510 peels the paper sheets wound around the buffer roller 505 from it, and guides them to a non-sort path 521 or sort path 522. The switch flapper 511 peels the paper sheets wound around the buffer roller 505 from it, and guides them to the sort path 522, or guides the paper sheets wound around the buffer roller 505 to a buffer path 523 in a wound-up state.

The paper sheets guided onto the non-sort path 521 by the switch flapper 510 are delivered onto a sample tray 701 via a pair of delivery rollers 509. A delivery sensor 533 for jam detection or the like is provided in the middle of the non-sort path 521. The paper sheets guided onto the sort path 522 by the switch flapper 510 are stacked on an intermediate tray (to be referred to as a processing tray hereinafter) 630 via conveying rollers 506 and 507. The paper sheets stacked in a bundle on the intermediate tray 630 undergo an alignment process, staple process, and the like as needed, and are delivered onto a stack tray 700 by delivery rollers 680a and 680b. The staple process for stapling the paper sheets stacked in a bundle on the processing tray 630 uses a stapler 601. The operation of the stapler 601 will be described later. The stack tray 700 is self-movable in the up-and-down directions.

The paper sheet from the first or second booklet path 553 or 554 is stored in a storage guide 820 by a pair of conveying rollers 813, and is further conveyed until its leading end contacts a movable sheet alignment member 823. A booklet entrance sensor 817 is arranged on the upstream side of the pair of conveying rollers 813. Two pairs of staplers 818 are arranged at the middle position of the storage guide 820, and each stapler 818 binds the center of a bundle of paper sheets in cooperation with an anvil 819 facing it.

A pair of folding rollers 826 are arranged on the downstream side of the staplers 818. An extrudable member 825 is arranged at the position opposing the pair of folding rollers 816. This extrudable member 825 is extruded toward the bundle of paper sheets stored in the storage guide 820, thereby extruding the bundle of paper sheets to the gap between the pair of folding rollers 826, and folding them by the pair of folding rollers 826. After that, the folded paper sheets are delivered onto a saddle delivery tray 832 via folded sheet delivery rollers 827. A booklet delivery sensor 830 is arranged on the downstream side of the folded sheet delivery rollers 827. When the bundle of paper sheets stapled by the staplers 818 are to be folded, the alignment member 823 is moved downward by a predetermined distance, so that the staple position of the bundle of paper sheets matches the central position of the pair of folding rollers 826.

The inserter 900 is arranged on the upper portion of the finisher 500, sequentially separates a bundle of paper sheets which serve as a cover sheet and inserting sheet stacked on a tray 901, and conveys them onto the finisher path 552 or booklet path 553. Note that paper sheets are stacked on the tray 901 of the inserter 900 with their obverse surfaces facing up. Paper sheets on the tray 901 are conveyed to a separation unit including conveying rollers 903 and a separation belt 904 by a feed roller 902 and are sequentially separated and conveyed one by one from the uppermost sheet. A paper sensor 910 which can detect that a bundle of paper sheets are stacked at a separable position is arranged at the distal end on the tray 901. A pair of extraction rollers 905 are arranged on the downstream side of the separation unit. A paper sheet separated by the pair of extraction rollers 905 is stably guided onto a conveying path 908. A feed sensor 907 is arranged on the downstream side of the pair of extraction rollers 905, and conveying rollers 906 for guiding the paper sheet on the conveying path 908 toward the pair of entrance rollers 502 are arranged between the feed sensor 907 and the pair of entrance rollers 502.

The differences between the printers 14 and 16 are that the printer 14 supports monochrome printing while the image forming unit of the printer 16 supports color printing, and that the printer 14 does not comprise any post-processing units while the printer 16 comprises them. Therefore, a description about the printer 14 will be omitted. Also, the printer 13 is not particularly limited, and a description thereof will be omitted.

<Software Configuration>

Figure 3:
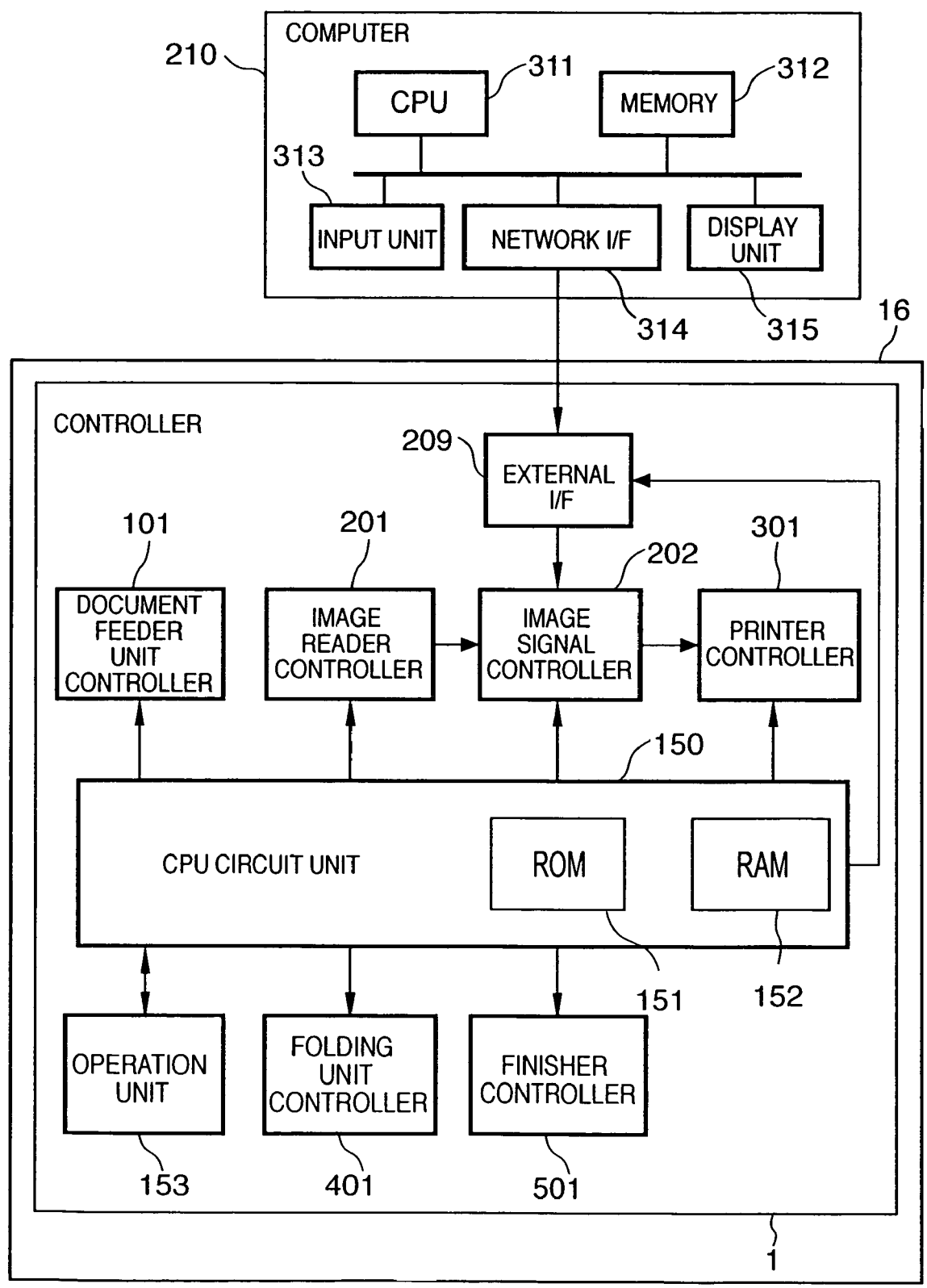
FIG. 3 is a block diagram showing a controller of the copying machine which comprises the post-processing unit according to this embodiment.
Figure 8:
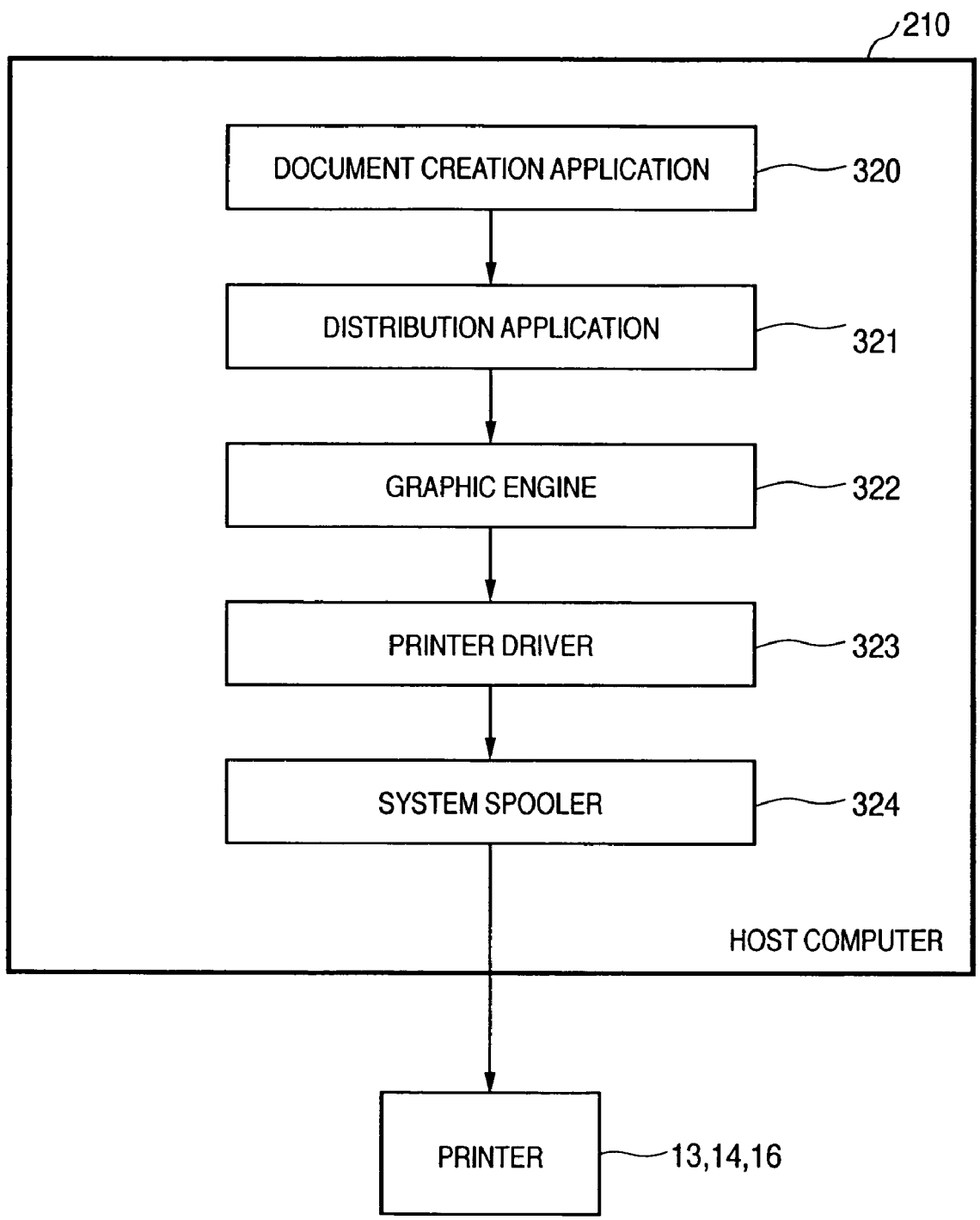
FIG. 8 is a block diagram showing the software configuration of the computer.

FIG. 8 is a block diagram showing the configuration of software modules in the computer 11 shown in FIG. 3.

Referring to FIG. 8, a document creation application 320, distribution application 321, graphic engine 322, printer driver 323, and system spooler 324 are program modules, which are present as files saved in an external memory such as a CD-ROM, hard disk, or the like, and are loaded onto a RAM 2 by an OS or another module when they run.

The document creation application 320, distribution application 321, and printer driver 323 can be added to an external memory 11 such as a hard disk or the like via an FD, CD-ROM, or network (not shown). The document application 320 and distribution application 321 saved on the external memory are loaded onto the memory 312 when they run. When a printing process is instructed from the application 321 to the printer 16 or the like, an output (rendering) process is made using the graphic engine 322 which is similarly loaded onto the memory and is ready to run.

The graphic engine 322 similarly loads the printer driver 323 prepared for each printing apparatus from the external memory onto the memory 312, and converts an output from the application 321 into a printer control command using the printer driver 323. The converted printer control command is output to the printer 13, 14, or 16 via the system spooler 324 loaded onto the memory 312 by the OS, and the LAN.

Note that the document creation application 320 is an application having a function of printing created data such as a document processing application, spreadsheet application, photo retouch application, and the like. The distribution application 321 is an application program for controlling a plurality of printers to attain distributed outputs. The example of FIG. 8 illustrates the printer driver 323 and printer one each. The printer driver 323 may include all or some printer drivers that can be used in the computer. The distribution application 321 divides a set of data to be printed (document data) into independent data for respective printers to be used, and passes them to corresponding printer drivers via the graphic engine (e.g., the GDI of Windows® and the like) together with information indicating print settings. Each printer driver generates a print job on the basis of the passed data and print settings, and transmits it to the corresponding printer to execute the print job. In this example, the document creation application 320 and distribution application 321 are independent application programs. Alternatively, the distribution application 321 may form a part of the document creation application 320.

<Processing Sequence in Distributed Process>

Figure 9:
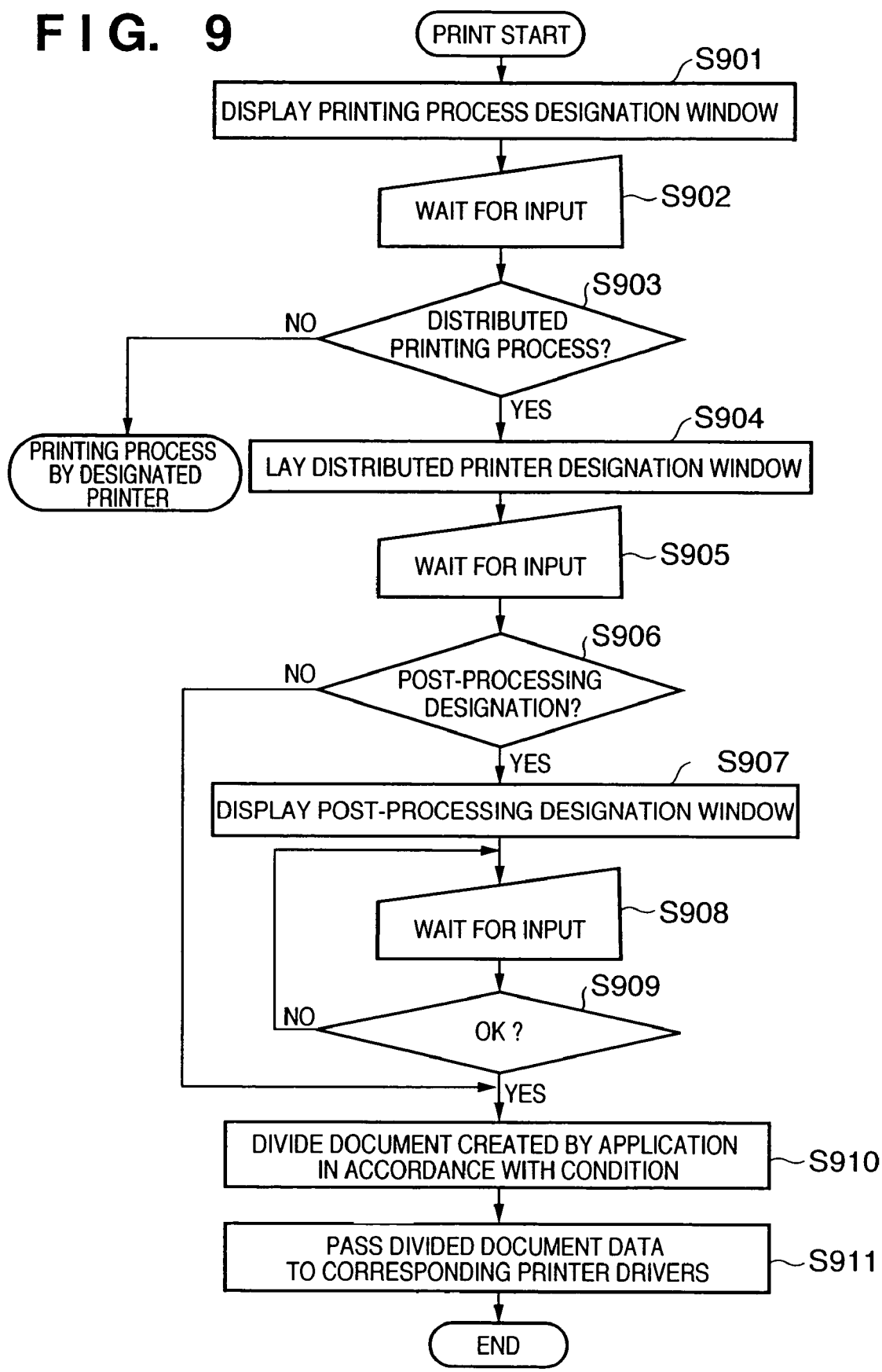
FIG. 9 is a flowchart of the processing sequence by a distribution application.
Figure 10:
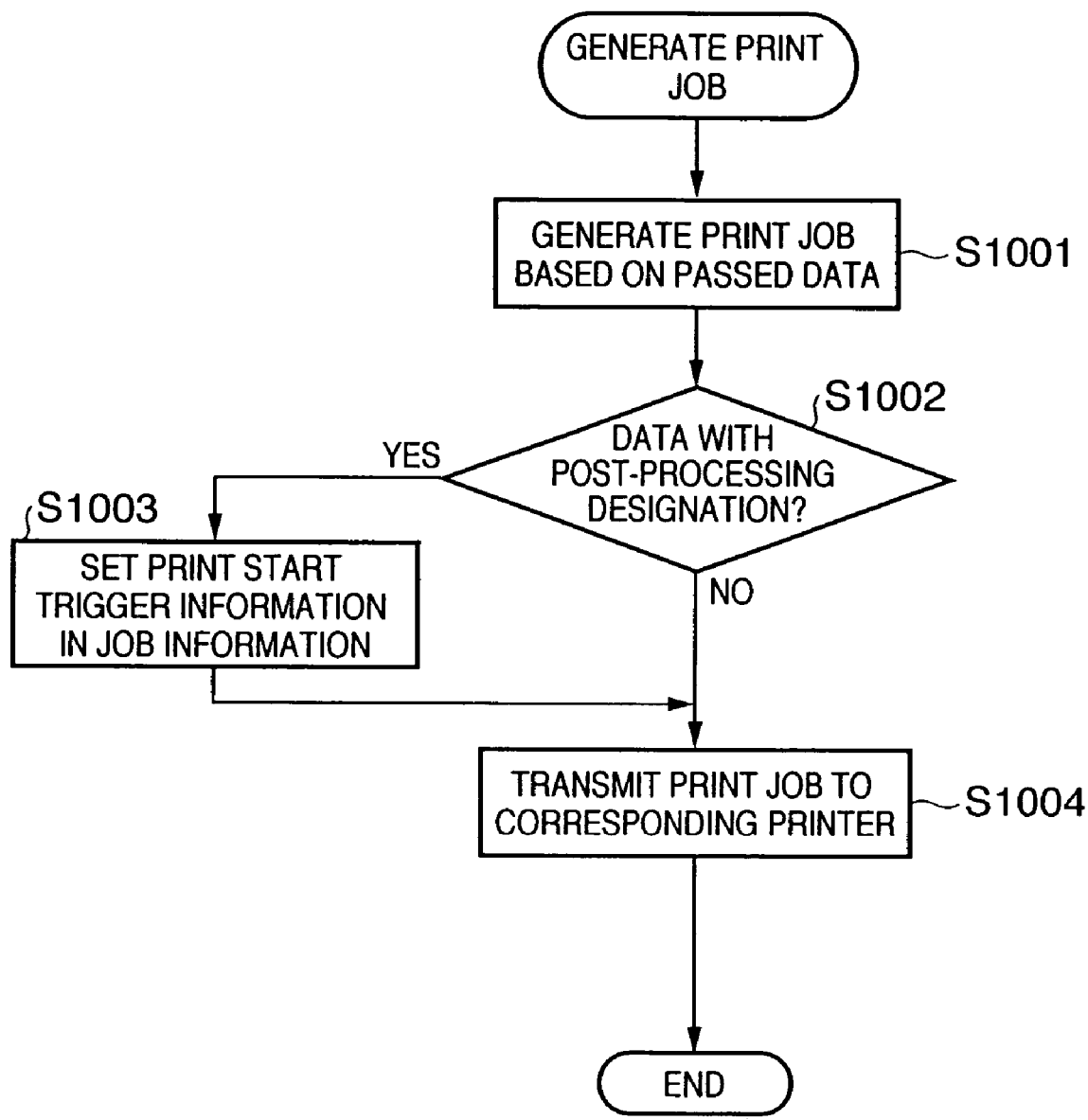
FIG. 10 is a flowchart of the processing sequence by a printer driver.
Figure 11:
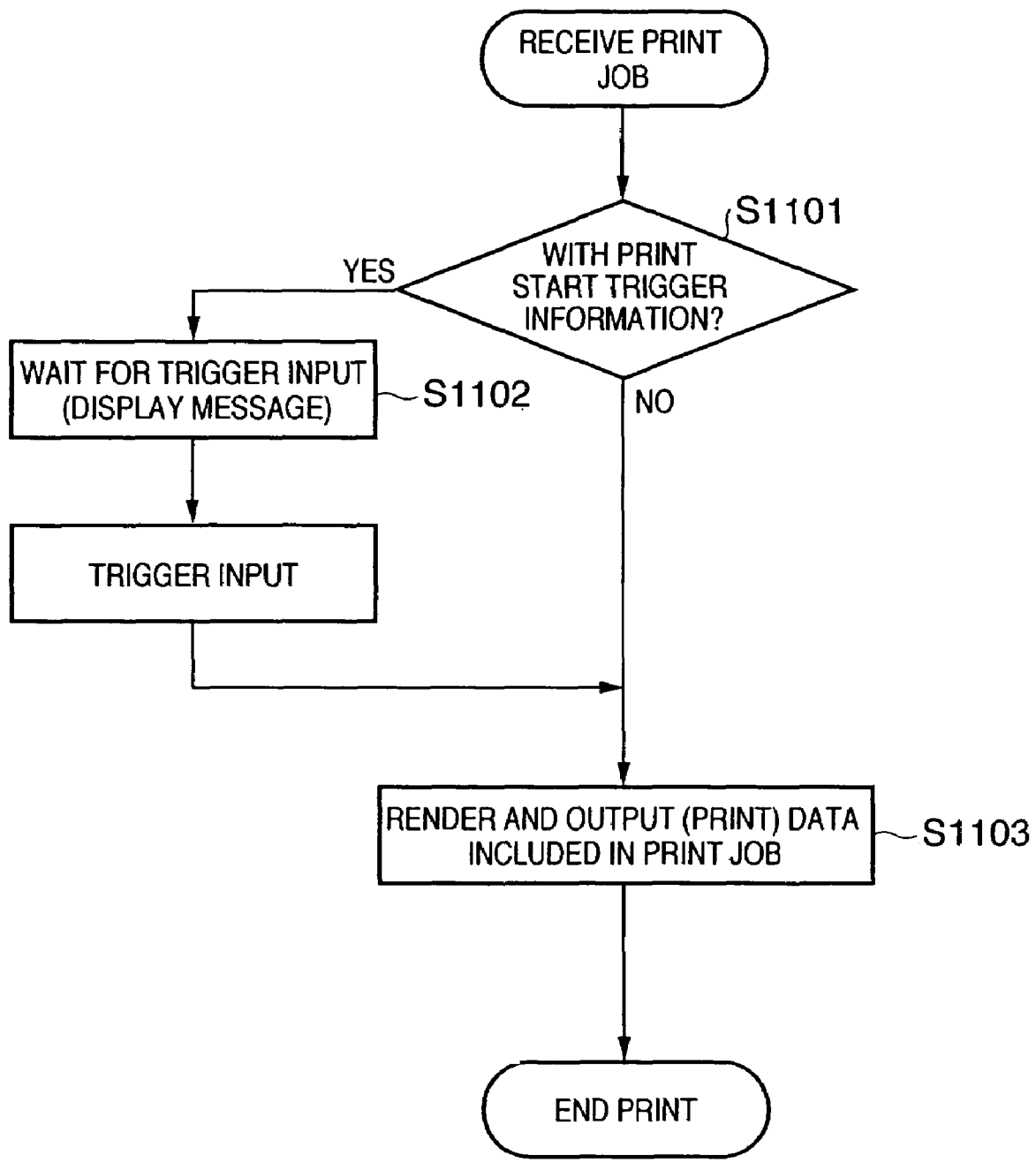
FIG. 11 is a flowchart of the processing sequence by a printer.

FIG. 9 shows the processing sequence executed by the distribution application 321 when a printing process is executed by the document creation application 320. FIG. 10 shows the processing sequence for generating a print job in the printer driver, and FIG. 11 shows the processing sequence in the printer that executes the print job.

Figure 6A:
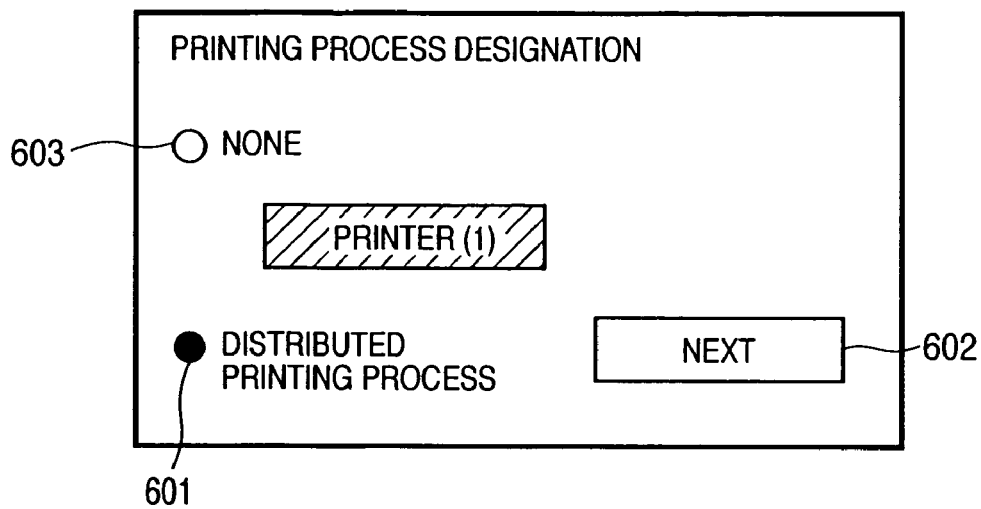
FIGS. 6A to 6C show operation windows on a computer of this embodiment.

The flow in FIG. 9 begins to be executed when a document print instruction is input from the document creation application 320. In step S901 a printing process designation window is displayed on the operation unit 153. FIG. 6A shows an example of this window. On this window, the user can select one of radio buttons "none" 603 that does not designate a distributed printing process, and "distributed printing process" 601 that designates distributed printing process. If the user selects "distributed printing process", he or she can proceed to the next setting by pressing a "next" button 602. If the user selects "none", he or she can designate a printer.

In step S902, the control waits for the selection input, and the input button is determined in step S903. If the "none" button 603 and the printer are selected, the flow branches to a printing process using the designated printer alone. This process is a normal printing process using one printer. On the other hand, if the "distributed printing process" button 601 and "next" button 602 are clicked, the flow advances to step S904 to display a distributed printer designation window, and the control waits for a designation input in step S905.

Figure 6B:
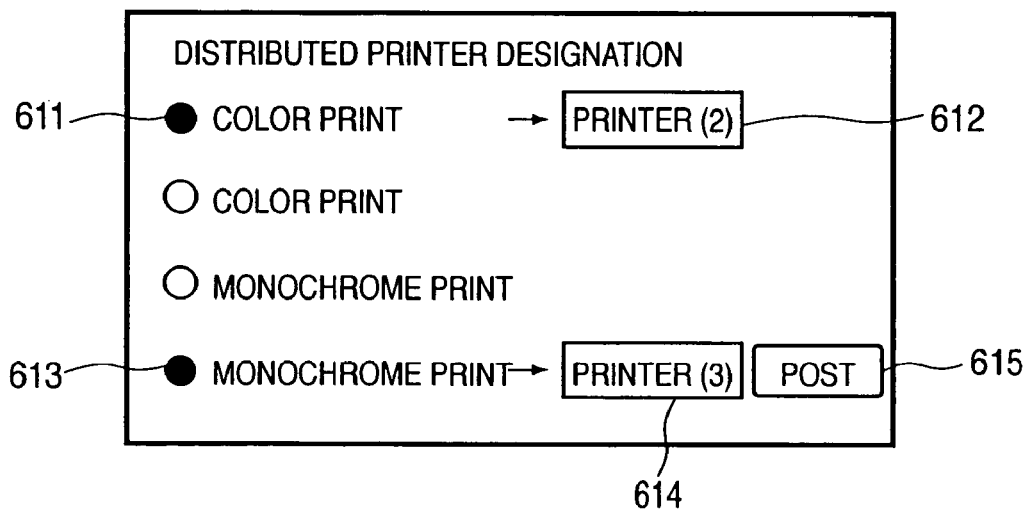

FIG. 6B shows an example of the distributed printer designation window. On this window, the user can input designation of printers used in the distributed printing process, and designation of a distribution method. In the example of FIG. 6B, the distribution method is separately set with reference to color and monochrome printing processes. More specifically, printers can be respectively designated for color and monochrome printing processes. In addition, the following method may be used. That is, when the user wants to speed up the printing process by means of parallel processes, he or she can designate a plurality of printers to be used. In this case, document data are evenly distributed to the designated printers. Also, designation methods with various other distribution references such as double-sided printing and single-sided printing, paper sizes, paper types, and the like may be adopted.

As for the printer with the post-processing function, a post-processing button 615 is displayed. Information indicating the function of each printer is loaded and saved by the computer together with the printer driver installed in the computer. When a post-processing unit is added later, information of its function may be acquired by polling the printer, or the user may input the information via the printer driver setting window. Upon input, the distribution method is designated by buttons 611 and 613, and printers are designated using designation fields 612 and 614.

After designation of the printers used and the distribution method is input in step S905, it is checked in step S906 if post-processing is designated, i.e., if the post-processing button 615 is clicked.

Figure 6C:
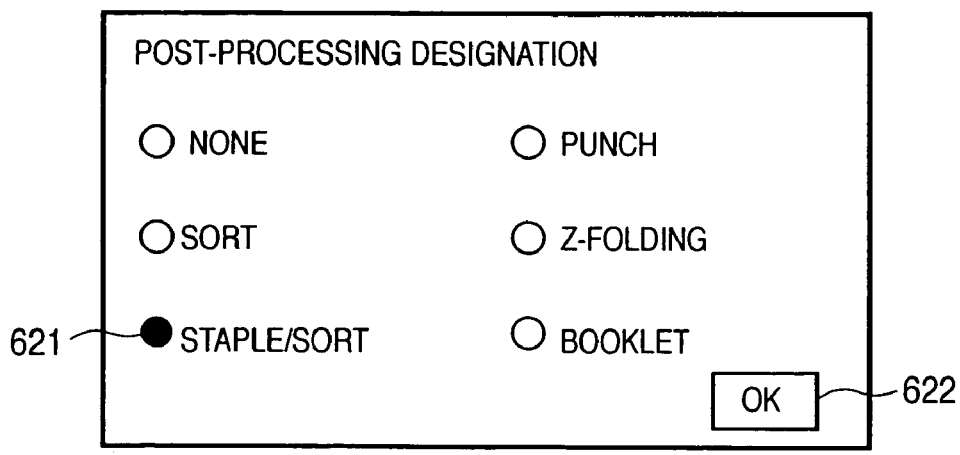

If the post-processing is designated, the flow advances to step S907 to display a post-processing designation window on the operation unit 153, and the control waits for a post-processing designation input in step S908. FIG. 6C shows an example of the post-processing designation window. This window displays a list of post-processing functions of the printer, the post-processing of which is designated, and prompts the user to check desired functions. In FIG. 6C, "staple/sort" is selected. It is checked in step S909 if an "OK" button 622 is clicked as an input. If the "OK" button 622 is clicked, the flow advances to step S910. If it is determined in step S906 that no post-processing is designated, the flow jumps to step S910.

In step S910, document data to be printed which is instructed to be printed by the document creation application is divided in correspondence with the printers used to print in accordance with the designated distribution method. In step S911, the divided document data (to be referred to as partial document data hereinafter are passed to the corresponding printer drivers to execute printing processes. For example, when different printers are designated for "color page" and "monochrome page", color pages of the document data are extracted from the source document data to be printed to create new partial document data. Also, the remaining monochrome pages are re-formed as new partial document data. At this time, the print designation contents (e.g., page numbers and the like) of document data which are to be changed by division are changed so that they are printed using values in the source document data to be printed intact. For example, if partial document data includes only the second page of the source document data which is designated to print serial page numbers, new print designation that designates the partial document data to start a page number from the second page is added. Also, designation indicating the presence/absence of post-processing designation, designated post-processing functions, and the like are passed to each printer driver as parameters indicating them.

The parameters to be passed to each printer driver include partial document information indicating the position of the partial document data of interest in the entire document. This position can be expressed by, e.g., the page numbers indicating the range of that partial document, and the number of pages of the entire document. The page numbers in this case are not those associated with the print settings, but are preferably series numbers from the first page of the document. When a processor refers to the partial document information appended to each partial document data, the position of that partial document data in the entire document can be immediately determined.

FIG. 10 shows the processing sequence by the printer driver which receives printing data (partial document data) in step S911 in FIG. 9. In step S1001, the printer driver generates a print job on the basis of the passed data. This process generates a set of print jobs by converting document data into a predetermined format such as image data or a printer description language that can be interpreted and executed, and appending a job header including job control information and the like.

In step S1002, the parameters which are passed from the distribution application and indicate the presence/absence of post-processing designation are checked. If the post-processing designation is appended to the passed data, the printer driver sets print start trigger information in, e.g., job information included in the job header or the like in step S1003. This print start trigger information is negotiated in advance as a value having a predetermined location, field code, or the like in data to be exchanged between the printer driver and printer. The print start trigger information is information indicating a trigger in response to which the printer that has received the print job with the post-processing designation starts a printing process. For example, depression of a given button on the printer, mounting of paper sheets on the inserter, or the like can be designated as a trigger. Of course, another event, e.g., an event generated by a host computer may be sent to the printer, and it may be designated as a trigger.

In step S1003, the printer driver also generates an inserter control command for inserting, as inserting sheets, partial document pages (some document pages of the distributed printing process) mounted on the inserter into partial document pages (remaining document pages of the distributed printing process). The printer driver appends that inserter control command to the print job information, and sends that information to the printer. This command can be generated based on the partial document information. For example, assume that information indicating "the total number of pages of the document" (e.g., a total of (n+1) pages) and "the range of the partial document of interest" (e.g., the second to n-th pages) is appended as partial document information to the partial document data with the post-processing designation. In this case, it can be determined that the first and (n+1)-th pages are supplied from the inserter. Then, an inserter control command for fetching the first page from the inserter, printing the second to n-th pages, and finally fetching the (n+1)-th page is further set in the job information in step S1003. In this manner, upon generating a print job from the partial document data with the post-processing designation, the partial document data to be printed is compared with the entire document, and an inserter control command for supplying deficient pages from the inserter is appended. This command includes information indicating the supply positions (for supplying paper sheets from the inserter after those page positions) from the inserter, and supply quantities (the number of sheets to be supplied from the inserter).

Of course, if the post-processing is designated, a finisher control command for controlling the finisher to execute the designated post-processing is appended to the print job.

Finally, in step S1004 the printer driver transmits the generated print job to the printer corresponding to that print job.

FIG. 11 shows the printing processing sequence in the printer that receives the print job transmitted in step S1004 in FIG. 10. Upon reception of the print job, the printer checks in step S1101 if the print job includes print start trigger information. This can be determined based on the location of information, field code, or the like negotiated with the printer driver. If the print start trigger information is included, the flow advances to step S1102 to delay the printing process until the print start trigger is input. If the print start trigger is input, data appended to the print job is rendered and is printed out in step S1103. If the received print job does not include any print start trigger information, the printing process starts after data for one band or page is stored.

In step S1103, the inserter control command included in the print job is also executed. When the inserter control command includes a sheet fetch command from the inserter, the printer fetches sheets in designated quantities at designated positions (pages) from the inserter to the post-processing apparatus in accordance with that command. In this way, printouts divisionally obtained by the plurality of printers are merged.

If the finisher control command is appended, the finisher process according to that command is executed under the control of the finisher controller 501.

Figure 7:
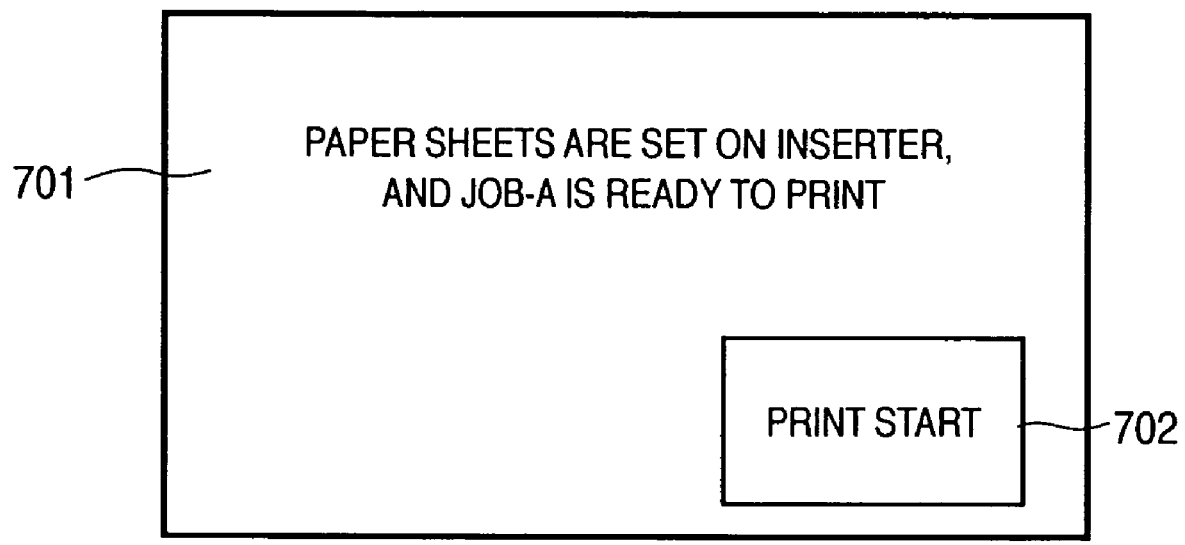
FIG. 7 shows an operation window of the copying machine which comprises the post-processing unit according to this embodiment.

FIG. 7 shows an example of the print start trigger. In the example of FIG. 7, when the paper sensor of the inserter detects that paper sheets are set, the window shown in FIG. 7 is displayed on the operation unit 153, and depression of a print start button 702 on the window in that state is used as the print start trigger.

As described above, according to the printing system of this embodiment, the printer with the post-processing designation delays the process of a print job to be executed until a signal serving as a trigger is input. For this reason, the printing process including the post-processing in that printer starts only after the trigger signal is input. When depression of a predetermined button after paper sheets are set on the inserter is used as a trigger, the user sets partial document pages printed by another printer on the inserter of that printer and clicks the predetermined button to execute the printing process of partial document data with the post-processing designation. The printer executes post-processing for, e.g., binding document pages including partial document pages set on the inserter.

In this way, since the user can designate the timing of the printing process including the post-processing, even when a set of prints are to be distributed and printed by a plurality of printing apparatuses, the post-processing function of at least one of the plurality of printing apparatuses can be effectively used, and a high-speed printing process including post-processing can be achieved.

<Print Example>

An example upon printing a document 501 in FIG. 5 from the computer 11 will be described below using FIGS. 6A to 7. The document to be output includes a plurality of pages, the first page (front cover) and last page (back cover) are color designed pages (color pages), and the remaining pages are monochrome pages including text, illustrations, and the like. Finally, this document 501 undergoes the staple process before it is output.

In this case, the printers on the LAN and the processing method are designated using the windows shown in FIGS. 6A to 6C on the screen of the computer 1. Initially, printing process designation contents are selected on the window in FIG. 6A. In FIG. 6A, "distributed printing process" indicated by a black dot is designated (in the following description, an item indicated by the black dot indicates the designated item).

When "none" is selected on the UI (User Interface) of FIG. 6A, hatching of "printer 1" disappears, and a printer connected onto the LAN becomes selectable, thus executing a normal printing process.

When "distributed printing process" is designated on the UI in FIG. 6A, the "next" key appears, and can be clicked. If the "next" key is clicked, the window in FIG. 6B is displayed. On the UI window of FIG. 6B, the user designates whether or not the document is to be printed using a plurality of printers. If the user does not designate a plurality of printers, the document is processed by a single printer. When only a plurality of monochrome printers or color printers are designated, the document is divided for respective pages or copies, and is printed using the designated printers. The division method is not limited to this. In this embodiment, "printer 2" is designated as color print, and "printer 3" is designated as monochrome print. With this designation, the front and back covers are printed by printer 2, and other document pages are printed by printer 3. When the printer with the post-processing function is designated, the "post-processing" key is displayed. Upon clicking the "post-processing" key, the window shown in FIG. 6C is displayed to allow the user to designate the post-processing functions. On this window, "staple/sort" is designated. When the printer with the post-processing function is designated in FIG. 6A, the window in FIG. 6C is also displayed, and the same designation is allowed. After the designation is completed, the setting process ends upon clicking of the "OK" key.

When an print execution instruction is issued from the computer 1 after completion of the setting process, data associated with the front and back covers are transferred to printer 2, undergo an image rasterize process, and are printed on the order of pages. At the same time, job information including data, the page order, the number of copies, post-processing designation information, and the like is transmitted to printer 3, which executes an image rasterize process according to the received data and stands by in a print ready state.

After the operator confirms using the operation unit of the printer or the computer screen that the printing process of printer 2 is completed, he or she sets the paper sheets output by printer 2 on the tray 901 of the inserter 900 of printer 3.

When the paper sheets are set on the tray 901, a message indicating that the paper sheets are set on the inserter and the transmitted job is ready to print, as shown in FIG. 7, is displayed on the screen of the operation unit (not shown) of the printer 3. When the operator clicks the "print start" key 702, the front cover is separated from the inserter tray 901, as described above, and is conveyed to the position of the pair of entrance rollers 502. After that, the paper sheet guided onto the sort path 522 by the switch flapper 510 is stacked on the processing tray 630 via the conveying rollers 506 and 507. The second and subsequent paper sheets begin to be printed without changing the order with the front cover, and go through the pair of entrance rollers 502 from the delivery rollers 118 and are similarly stacked on the processing tray 630. Finally, the back cover is fed from the inserter tray 901, and is stacked on the processing tray 630. The bundle of sheets on the processing tray 630 are stapled by the stapler 601, and are stacked on the stack tray 700. If a plurality of copies are to be printed, the aforementioned process is repeated, thus ending the print job.

Second Embodiment

In the first embodiment, when paper sheets are set on the inserter 900, it is confirmed if the print job of printer 3 is to be started, and after the operator's operation, the printing process is started. Alternatively, when a bundle of sheets are set on the inserter 900, the printing process may be automatically started. More specifically, in this embodiment, when the paper sensor 910 detects that paper sheets are set on the inserter 900, printer 3 starts a print job in response to that detection signal as a trigger.

In order to prevent the distributed print job from being suspended when another print job or a copy job is input before the operator sets paper sheets on the inserter 900, if a print job that requires post-processing is transferred as divided data (partial document data) and stands by in a print ready state, reception of another job (another print job, a copy job, or the like) may be inhibited. In this case, when a predetermined period of time has elapsed after completion of the printing process of the printer 14, the reception inhibition state is canceled. For this purpose, the computer 11 monitors completion of the print job of partial document data in the printer 14, and starts a timer upon completion of the print job. After a predetermined period of time has elapsed, the computer 11 issues a reception inhibition state cancel command to the printer 16. Upon reception of that command, the printer 16 cancels the reception inhibition state of another job. In this way, another job can be prevented from interrupting while execution of the distributed print job is delayed. Also, the reception inhibition (interrupt inhibition) state can be canceled by the timer. For this reason, when the condition that disturbs the progress of processes (e.g., an error in another printer that executes the distributed process) has occurred, another job may be executed. In this manner, even when printers equipped in an environment used by a plurality of users are used in the distributed printing process, appropriate printers can be assured and shared.

Third Embodiment

In the first embodiment, a print command is issued from the computer. By contrast, when the printer 14 is used to copy a document including a plurality of pages, as shown in FIG. 5, color and monochrome pages are checked upon scanning the document. Then, a color printing process is executed by the printer 14. Also, monochrome page data and the like are transferred to the printer 16, which executes a monochrome printing process. After that, the printed pages undergoes sort and staple processes to complete the job.

In the third embodiment, even in a document copy process, a color-copying machine with a low print speed is not used in a printing process including a monochrome printing process, but a high-speed apparatus that can also execute post-processing is used to execute the monochrome printing process, thus obviating the need for the sort and staple processes of copied paper sheets.

Fourth Embodiment

In the first to third embodiments, the printer with the finisher must save printing data, job information, and the like included in a print job transmitted from the computer until execution of the print job starts. Hence, if a print job with post-processing designation is saved by the computer without being transmitted from the computer to the printer, the printer need not save data and the like included in the print job.

In this case, if the printer driver determines that the print job includes post-processing designation, it does not transmit the print job, and transmits a printer reservation command to the printer that executes post-processing. Upon reception of the reservation command, if a print start trigger signal (panel input or sensor input), the printer informs the computer of it. Upon reception of that notification, the computer transmits the transmission-reserved print job to that printer.

In this way, the required memory size of the printer can be reduced.

OTHER EMBODIMENT

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-085238, filed on Mar. 23, 2004, which is hereby incorporated by reference herein.

What is claimed is:

1. A printing apparatus for executing a printing process on the basis of a print job from an external apparatus, comprising:

a post-processing unit which can apply post-processing for printed paper sheets using paper sheets prepared independently of the printed paper sheets;

a detector for detecting in said post-processing means that the paper sheets prepared independently of the printed paper sheets are set;

determination means for determining whether or not print start trigger information is attached to the print job, which indicates an instruction to start printing in response to trigger information to start printing; and print control means for, (i) when a print job designated with the post-processing by said post-processing unit is received and it is determined that the print start trigger information is attached to the received print job, delaying a process of the print job until said detector detects that the paper sheets are set, and starting execution of the print job when said detector detects that the paper sheets are set, (ii) and when a print job designated with the post-processing by said post-processing unit is received and it is determined that the print start trigger information is not attached to the received print job, starting the received print job independently of a detection by said detector.

2. An information processing apparatus connected to a printing apparatus with a post-processing unit, which includes the post-processing unit which can apply post-processing for printed paper sheets using paper sheets prepared independently of the printed paper sheets, and a print control unit which starts, when a print job designated with the post-processing by the post-processing unit is received, execution of the print job in response to an input trigger signal, comprising:

job division means for dividing a set of printing data into the printing apparatus with the post-processing unit and another printing apparatus, and generating respective print jobs;

append means for appending, to a print job, print start trigger information indicating an instruction to start printing in response to an input of trigger information to start printing when a post-processing is designated for the print job to be transmitted to the printing apparatus with a post-processing unit; and a transmitter for transmitting the print job appended with the print start trigger information by said append means to the printing apparatus with the post-processing unit.

3. A printing system formed by connecting an information processing apparatus and a printing apparatus with a post-processing unit, said printing apparatus with a post-processing unit, comprising:

a post-processing unit which can apply post-processing for printed paper sheets using paper sheets prepared independently of the printed paper sheets;

an input unit; and a print controller for when a print job designated with the post-processing by said post-processing means is received, delaying a process of the print job until an operator makes a predetermined key input at the key panel, and starting execution of the print job when the operator makes the predetermined key input by said key panel, and said information processing apparatus comprising:

append means for appending, to a print job, print start trigger information indicating an instruction to start printing in response to an input of trigger information to start printing when a post-processing is designated for the print job to be transmitted to the printing apparatus with a post-processing unit;

a transmitter for transmitting the print job appended with the print start trigger information that designates post-processing by said designation means to said printing apparatus with the post-processing unit; and job division means for dividing a set of printing data into said printing apparatus with the post-processing unit and another printing apparatus, and generating respective print jobs, wherein when a set of printing data are divided into a plurality of print jobs by said job division means and post-processing is to be executed by said printing apparatus with the post-processing unit, said append means appends the print start trigger information that designates post-processing to the print job to be transmitted to said printing apparatus with the post-processing unit.

4. A method of controlling a printing apparatus which comprises a post-processing unit which can apply post-processing for printed paper sheets using paper sheets prepared independently of the printed paper sheets, and a detector for detecting in the post-processing unit that the paper sheets prepared independently of the printed paper sheets are set, comprising:

a determining step of determining whether or not print start trigger information is attached to the print job, which indicates an instruction to start printing in response to trigger information to start printing; and a delaying step of delaying, when a print job designated with the post-processing by said post-processing unit is received and it is determined that the print start trigger information is attached to the received print job, a process of the print job until the detector detects that the paper sheets are set;

a step of starting execution of the print job when the detector detects that the paper sheets are set; and a step of starting execution of the print job independently of a detection by said detector when it is determined that the print start trigger information is not attached to the received print job.

5. A print control method which executes a printing process using a printing apparatus with a post-processing unit, which includes the post-processing unit which can apply post-processing for printed paper sheets using paper sheets prepared independently of the printed paper sheets, and a print control unit which starts, when a print job designated with the post-processing by the post-processing unit is received, execution of the print job in response to an input trigger signal, and another printing apparatus, comprising:

a job division step of dividing a set of printing data into the printing apparatus with the post-processing unit and another printing apparatus, and generating respective print jobs;

an appending step of appending, to a print job, print start trigger information indicating an instruction to start printing in response to an input of trigger information to start printing when a post-processing is designated for the print job to be transmitted to the printing apparatus with a post-processing unit; and a transmission step of transmitting the print job appended with the print start trigger information that designates post-processing in the designation step to the printing apparatus with the post-processing unit.

6. A print control method using an information processing apparatus and a printing apparatus including an input unit and a post-processing unit which can apply post-processing for printed paper sheets using paper sheets prepared independently of the printed paper sheets, comprising:

an appending step of appending, when a print job is to be transmitted from the information processing apparatus to the printing apparatus, print start trigger information that designates an instruction to start printing in response to an input of trigger information to start printing to the print job;

a transmission step of transmitting the print job appended with the print start trigger information in the appending step from the information processing apparatus to the printing apparatus;

a determining step of determining whether or not print start trigger information is attached to the print job, which indicates an instruction to start printing in response to trigger information to start printing;

a print controlling step of delaying, (i) when a print job designated with the post-processing by said post-processing unit is received and it is determined that the print start trigger information is attached to the received print job, a process of the print job until the detection means detects that the paper sheets are set, then starting execution of the print job when the detector detects that the paper sheets are set, and (ii) when it is determined that the print start trigger information is not attached to the received print job, starting execution of the print job independently of a detection by said detector; and a post-processing step of applying post-processing using paper sheets prepared independently of printed paper sheets for the job appended with the information that designates post-processing in the designation step in the printing apparatus.

7. A computer-readable recording medium that records a program for making a computer control a printing apparatus which comprises post-processing unit which can apply post-processing for printed paper sheets using paper sheets prepared independently of the printed paper sheets, and detector for detecting in the post-processing means that the paper sheets prepared independently of the printed paper sheets are set, said program comprising:

a code of a determination step of determining whether or not print start trigger information is attached to the print job, which indicates an instruction to start printing in response to trigger information to start printing;

a code of a delay step of delaying, when a print job designated with the post-processing by said post-processing unit is received and it is determined that the print start trigger information is attached to the received print job, a process of the print job until the detector detects that the paper sheets are set;

a code of a step of starting execution of the print job when the detector detects that the paper sheets are set; and a code of a step of starting execution of the print job independently of a detection by said detector when it is determined that the print start trigger information is not attached to the received print job.

* * * * *

UNITED STATES PATENT AND TRADEMARK OFFICE
CERTIFICATE OF CORRECTION

PATENT NO. : 7,245,845 B2
APPLICATION NO. : 11/084125
DATED : July 17, 2007
INVENTOR(S) : Yoshinori Isobe et al.

It is certified that error appears in the above-identified patent and that said Letters Patent is hereby corrected as shown below:

COLUMN 9:
Line 46, "hereinafter" should read --hereinafter)--.

COLUMN 12:
Line 41, "an" should read --a--.

COLUMN 13:
Line 59, "undergoes" should read --undergo--.

COLUMN 15:
Line 64, "for" should read --for,--.

COLUMN 18:
Line 10, "comprises" should read --comprises a--.
Line 12, "and" should read --and a--.

Signed and Sealed this

Eighth Day of July, 2008

JON W. DUDAS
*Director of the United States Patent and Trademark Office*